Feb. 28, 1956  R. HIGONNET ET AL  2,736,249
PHOTOGRAPHIC COMPOSING APPARATUS
Filed Jan. 30, 1952  2 Sheets-Sheet 1
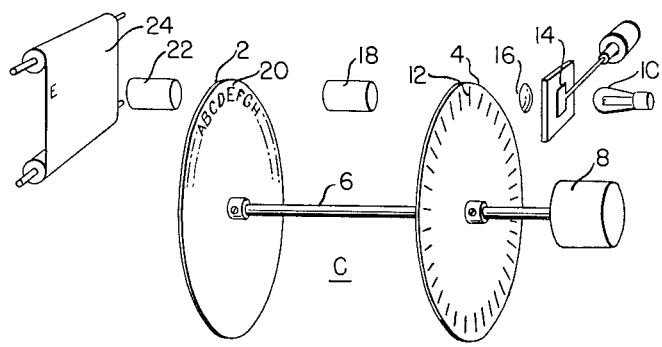
Fig. 1
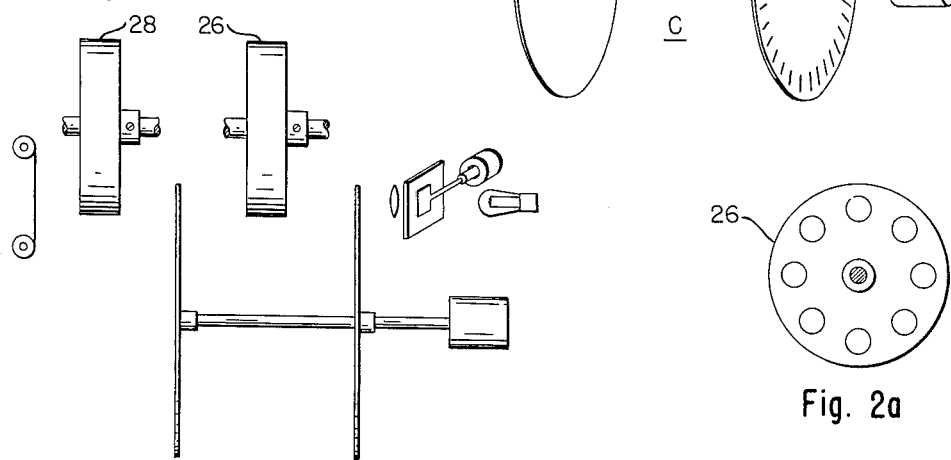
Fig. 2
Fig. 2a
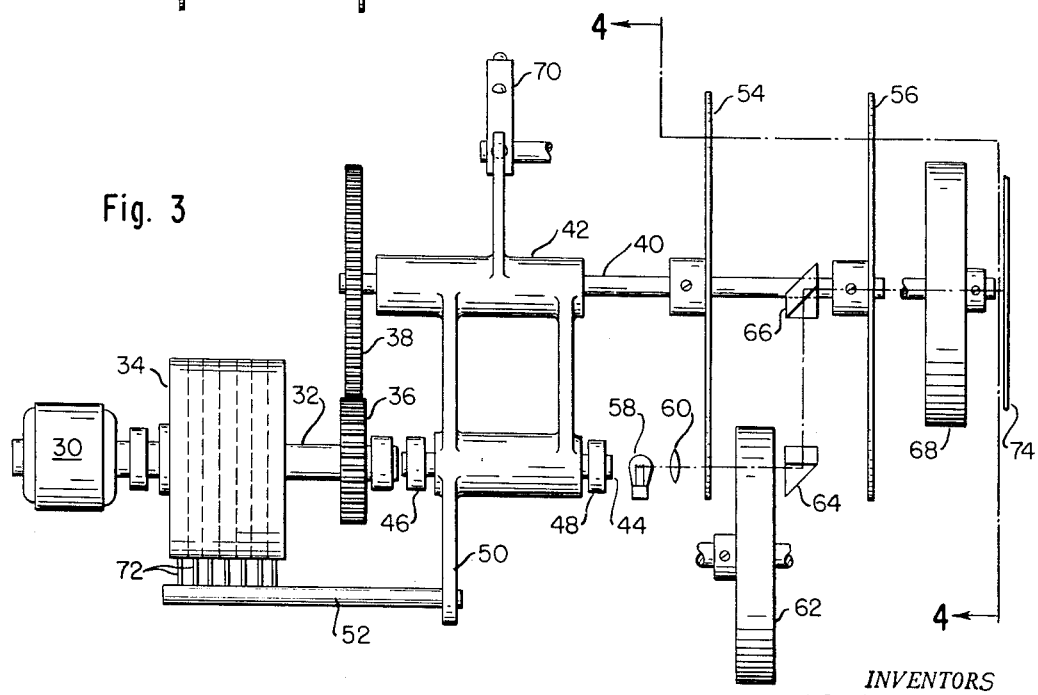
Fig. 3
INVENTORS
LOUIS MOYROUD
RENÉ HIGONNET
BY
ATTORNEYS

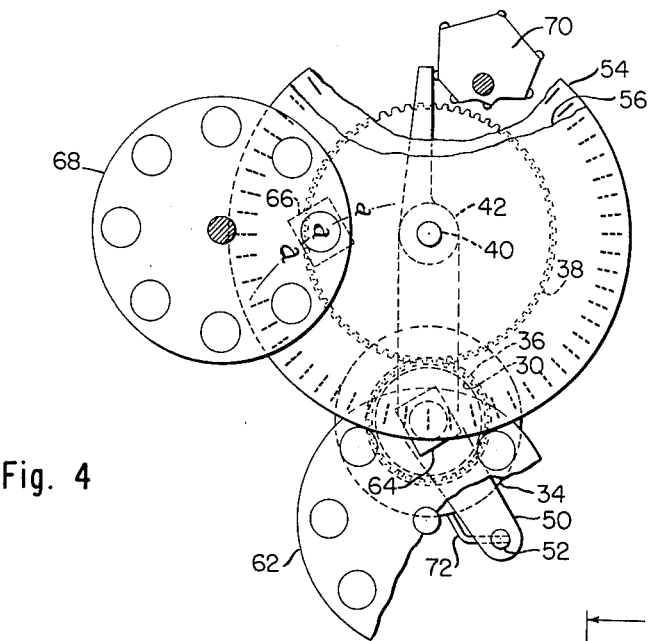
Fig. 4
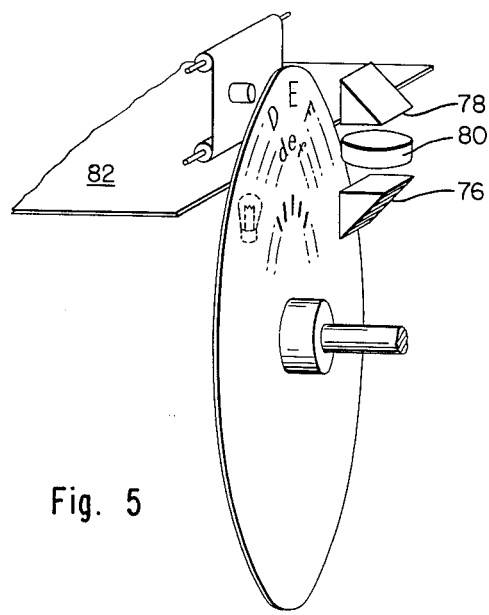
Fig. 5
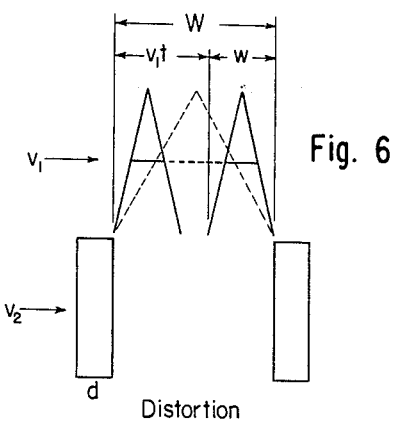
Fig. 6 Distortion
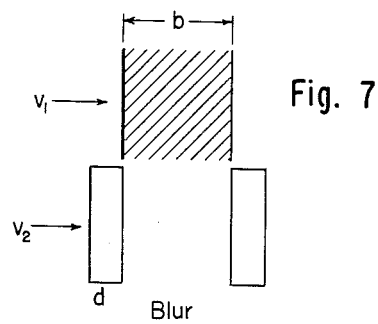
Fig. 7 Blur
*INVENTORS*
LOUIS MOYROUD
RENÉ HIGONNET
BY
ATTORNEYS United States Patent Office 2,736,249
Patented Feb. 28, 1956

2,736,249

PHOTOGRAPHIC COMPOSING APPARATUS

Rene Higonnet and Louis M. Moyroud, Cambridge, Mass., assignors to Graphic Arts Research Foundation, Inc., Cambridge, Mass., a corporation of Delaware Application January 30, 1952, Serial No. 269,056

13 Claims. (Cl. 95—4.5)

The present invention relates to photographic composing apparatus, and more particularly to a device for the stroboscopic projection of the images of selected characters displayed on a carrier moving relative to the sensitive film upon which the text is to be composed.

In a patent to Higonnet No. 2,486,406 a stroboscopic arrangement for the projection of characters is described, in which the characters to be projected are arranged in a circle on one disk and corresponding slits or apertures are similarly arranged upon a second disk. The slits or apertures are illuminated by a source of light, and the projected images of the slits are caused to sweep across the characters in the opposite direction to that in which the characters are moving. The relative motion of the slit images and characters is brought about by mounting the two disks on the same axis, but rotating them in opposite directions.

The present invention involves apparatus employing the basic principle of the above patent. That is, instead of projecting each character by a brilliant flash of light which is short in duration as compared with the time of passage of each character past a projection position, the illumination of each character is of appreciably longer duration, and takes place in the form of a partial projection of the character moving progressively from one side of the face of the character to the other.

An important feature of the invention resides in the provision of a carrier having mounted thereon in rigid relationship both the characters to be projected and the slits or apertures through which the light is shuttered. It will be seen that the precision of the alignment of each projected character upon the sensitive surface depends upon the precision of the alignment of each character with its corresponding aperture, whereby an important advantage is provided by this type of construction.

It is therefore a principal object of the invention to provide means for the projection of selected characters upon the composing surface in a precise fashion, although the characters themselves are moving continuously during the period of projection.

Another object of the invention is to provide a character projection means adapted to cooperate with quickly interchangeable optical systems, whereby the projected images may either be magnified or reduced proportionately in both dimensions, or magnified or reduced in one dimension only.

Another object of the invention is to provide projection means for optically distorting the characters to be projected to produce slanted images similar to italics, or otherwise to distort the images for special artistic effects.

With the above objects in view, another feature of the invention includes an optical system adapted to project the image of each aperture upon its corresponding character, and to cause the image to move across the face of the character, or "sweep" the character, said relative motion being the combined result of the properties of the optical system and the motion of the carrier bearing the characters and slits relatively thereto.

Other features and objects of the invention include certain novel arrangements, forms of construction and modes of operation hereinafter described, and more particularly defined by the claims.

In the drawings, Fig. 1 is a schematic view of a preferred embodiment of the projection apparatus according to the invention; Fig. 2 is a schematic view of a variation of the embodiment of Fig. 1 employing lens turrets for changing the magnification and degree of distortion of the projected images; Fig. 2a is an end view of one of the lens turrets shown in Fig. 2; Fig. 3 is a projection of an embodiment of the invention employing means for changing the font of the projected characters; Fig. 4 is an end view of Fig. 3 looking from the right; Fig. 5 is a schematic view of an embodiment of the invention in which the apertures are mounted on the same disk with the characters to be projected; and Figs. 6 and 7 are diagrams to illustrate the operation of the apparatus.

In Fig. 1 the characters and apertures (slits) are arranged on two separate disks 2 and 4, respectively, the disks being rigidly fixed to a shaft 6 driven continuously by a motor 8. For purposes of discussion, the rotating assembly including the disks 2 and 4 and the shaft 6 is hereinafter referred to as the carrier, or carrier assembly, C. An incandescent lamp 10, continuously illuminated, is placed in position to illuminate an aperture 12 through a shutter device 14 and a condensing lens 16. It will be understood that the shutter 14 is synchronized with the carrier and opens the light path only during the interval in which the aperture corresponding to the selected character passes before the lens 16. The lamp 10 and shutter 14 are only illustrative of numerous devices which may be employed for the same purpose, as will be understood by those familiar with the art.

Interposed between the character and aperture disks is an optical system 18, having focal planes coincident with the circle of apertures on the right hand side and with the circle of characters on the left hand side; in other words the optical system 18 is capable of forming an image of one of the slits in the plane of the characters 20. It is assumed that the optical system 18 has a ratio of magnification M. For a given width of aperture an image having a width M times the actual aperture width is cast upon a corresponding character 20. The constants of the apparatus are such that the width of the aperture image is less than that of the character, so that at any instant while the aperture image impinges upon the character 20, only a partial image of the character is projected through a projection system 22 upon a sensitized surface 24.

As will be seen from the following discussion, there are certain conditions of the described apparatus in which the combined effect of the motion of the carrier C and the optical properties of the optical system 18 is to cause the slit or aperture image to move across the character face, thus progressively illuminating all parts of the character and causing a complete projection of the character image upon the surface 24.

In order to describe more fully the operation of the described apparatus, it is necessary to make assumptions both as to whether the optical system 18 throws a rectified or inverted image of the aperture, and as to the magnification M of the system. Also, while it is assumed in the embodiment of Fig. 1 that the apertures and characters are at the same radius from the axis of rotation, in other embodiments where the radii are different this added factor will also enter into the considerations. Accordingly, it is useful to consider three possible cases: case I, in which the character and the slit image are moving in opposite directions as a result of the inversion of the optical system 18, case II, in which the character and the slit image are moving in the same direction, but with the character moving faster; and case III, in which the character and the slit image are moving in the same direction, but with the slit image moving faster. In cases II and III the optical system 18 throws an erected image of the slit, but in case II the magnification ratio M is less than unity, while in case III it is greater than unity.

Under each of the above cases, two properties of the system will be considered. The first is the distortion "$r$," which is defined as the ratio of the width of the character image projected upon the sensitive surface 24 to the width of the character 20 on the disk 2 from which it is projected. The discussion of this property is facilitated by assuming that the magnification ratio of the projection system 22 is unity. It is obvious that the height of the projected character image will be the same as that of the character 20 under all three cases. The second property is the blur "$b$," which is defined as the width of the projected image of a very thin vertical line in one of the characters of the disk 2.

First considering case III, it is apparent that since the aperture image and the character are moving in the same direction, the width of the projected character image is greater than that of the character. As shown in Fig. 6, a character "A" of width $w$ is projected as a character of width W.

(1) $$r = \frac{v_2}{v_2 - v_1}$$

where $v_1$ represents the lineal or circumferential velocity of the character 20, and $v_2$ represents the lineal or circumferential velocity of the aperture image across the face of the character. Taking the time $t$ as that required for passage of the slit image across the complete face of the character, and assuming for the purposes of this derivation that the image $d$ is of negligible width, $$W = v_1 t + w = v_2 t$$

where $v_1$=the lineal velocity of the character and $v_2$ that of the image of the slit. Eliminating $t$ from these equations gives the distortion ratio (1) $$r = \frac{W}{w} = \frac{v_2}{v_2 - v_1}$$

An expression for blur is arrived at as shown in Fig. 7, wherein a vertical line of zero thickness is projected as a rectangle of width $b$. Here the image width $d$ must be taken into account.

$$b = v_1 t = v_2 t - d$$

Again eliminating $t$ gives (2) $$b = d \frac{v_1}{v_2 - v_1}$$

Considering Equations 1 and 2 together, it appears that the behavior of the distortion ratio $r$ is of comparatively little concern, since the character on the disk 2 can be distorted to any width which is found to be necessary for the projection of a character of the desired width for a given magnification M. However, the amount of blur is an important consideration which places limits upon the permissible width of the slits or apertures on the disk 4, and also upon the magnification ratio M, as seen by its effect upon the relative values of $v_1$ and $v_2$. The relationship of blur to distortion ratio is given by (3) $$\frac{b}{r} = \frac{v_1 d}{v_2}$$

It will be seen that Equations 1 and 2 are general for all three cases. For case I, $v_2$ is negative. In case I, $b$ is negative, and in case II both $r$ and $b$ are negative. A negative sign on blur is of no particular significance, but the sign of the distortion ratio $r$ determines whether or not the characters 20 are inverted on the disk 2.

In any case, if the disks 2 and 4 are on the same shaft, $v_1$ is determined by the shaft speed, and $v_2$ is determined by the magnification ratio M.

Referring specifically to case I, wherein the characters and images move in opposite directions, the following conclusions can be drawn: If $v_1 = v_2$, $r = \frac{1}{2}$, that is, the projected character is one-half the width of the character 20, and this means that each character 20 on the disk 2 should be distorted to twice the width of the desired projected character. The blur $b = \frac{1}{2} d$, meaning that a vertical line of zero width on the disk 2 would be projected as if it were a line of width $\frac{1}{2} d$ on a stationary matrix. This requires that the apertures 12 be as small as is consistent with the passage of sufficient light for illumination. This case is realized by using a simple (but suitably corrected) inverting lens system at 18. For large values of M, $v_2$ becomes large, and the ratio $r$ approaches unity (meaning that the characters on the disk 2 need be distorted but slightly) while the blur approaches zero, but the exposure becomes correspondingly small.

In case II the character and slit images are moving in the same directions, but the character image is moving faster than the slit image. The distortion ratio $r$ is negative, which means that, if the projecting lens 22 is an erecting lens, the image of the projected character is inverted, and therefore the characters on the disk 2 must be properly oriented in order to produce the desired orientation upon the sensitive surface 24. (It will be appreciated that any statements as to orientation of the projected characters must take into account the arrangement and direction of feed of the surface 24, as well as the character of the lens systems; these factors are readily accounted for by those skilled in optics, and no attempt is made here to specify all possible arrangements of these parts.) For very small values of $v_2$, the inverted character image is of reduced width. For $$v_2 = \frac{v_1}{2}$$

the distortion ratio $r$ is unity, that is, the projected image is of exactly the same width as the character itself. As $v_2$ approaches the value of $v_1$, the distortion ratio increases above unity and approaches infinity for the case $v_2 = v_1$. For very low values of $v_2$ the blur approximates the slit width $d$. For the case $$v_2 = \frac{v_1}{2}$$

the blur is twice the slit width. As $v_2$ approaches $v_1$ the blur approaches infinity.

In case III, the character and slit images are also moving in the same direction, but the slit image is moving faster than the character. The distortion ratio is always positive. It is infinite for the case $v_2 = v_1$. As $v_2$ increases above $v_1$ the distortion ratio is progressively reduced, and approaches unity for values of $v_2$ greatly in excess of $v_1$. The blur has a negative sign, and as in case I it approaches zero as $v_2$ approaches infinity.

In any case, the velocities are so chosen that a proper exposure is obtained. From Fig. 7, it will be clear that the exposure time for any element of the projected character is the time "$t$" which appears in the derivation of Equation 2. If this time is designated by E, $$b = v_1 E$$

and the ratio of blur to exposure is $$\frac{b}{E} = v_1$$

E is fixed by the sensitivity of the photographic material; $v_1$ is then chosen as the maximum carrier speed at which the blur does not exceed tolerable limits. The velocity $v_2$ and the slit image width $d$ are then determined. These quantities are related by (2); a large value of $d$ requires a large value of $v_2 - v_1$. The actual value of $v_2$ is obtained from the lens system; since the disks rotate at the same speed, $v_2 = Mv_1$. The simplest construction is that of case I, wherein the lens 18 is a simple inverting lens with $M = -1$, whereby $v_2 = -v_1$, and the slit image sweeps across the character at the same velocity as the character speed but in the opposite direction. The characters must be distorted to double width.

The discussion above assumes that for present purposes the characters and the slit images may be assumed to move in straight lines during the period of projection. However, the motions actually follow arcuate paths, and in the case of an inverting optical system 18 (case I) the slit image follows the arc of a circle tangential to the circle through which the character is moving. The effect of this phenomenon for characters of common point-sizes and apertures on a radius of only a few inches is negligibly small.

As indicated above, an inherent advantage resides in the feature whereby the two disks are secured to the same shaft. This eliminates the problem of mechanical linkage through gears with accompanying backlash, play and wear, and insures the exact registration of each character with its corresponding stroboscopic slit. Since only one slit is used to project any one character, the precise positioning of the character image upon the sensitive surface 24 can be assured by manufacturing the entire carrier unit C in such a manner that the characters and corresponding slits are positioned upon their respective disks in precise spatial relationship. That is, the disks 2 and 4 may be secured to the shaft 6 before the characters and apertures are disposed upon the disks, and each character and its corresponding slit may then be photographically projected on the disks in precise relationship. It will be noted that the required precision may be achieved merely by assuring the precise spatial relationship of each character to its corresponding slit, and it is immaterial whether the slits are precisely spaced with respect to one another, or whether the characters are precisely spaced with respect to one another. If there is a variation in the spacing between adjacent characters, the same variation takes place between the associated stroboscopic slits.

Certain additional factors may be considered in designing apparatus according to this invention. One such factor is diffraction, or the bending of the light rays around the edges of the apertures 12. In general, this imposes a lower practical limit on the scale of the apparatus. Another factor is the grain of the photographic surface 24.

Up to this point it has been assumed that the scanning slit is parallel to the vertical sides of the master characters on the disk 2, so that the resultant distortion takes the form of a reduction or increase in the width of the projected character image. If the character were swept by a slanted slit image a different type of distortion of the character image would be produced. This can be taken advantage of to obtain italics from a Roman type face. The result may be produced either by orienting the slits in a slanted fashion on the disk 4, or by inserting in the optical system 18 an anamorphosing element which has the effect of turning the projected slit image through any desired angle. Also, the slit disk may be provided with two concentric circles of slits, one circle having vertical slits and the other circle having slanted slits, and the optical system 18 may be selectively raised or lowered to bring one or the other circle into operative relationship with the projection system.

The above discussion also assumes that the characters are swept stroboscopically in the horizontal direction. It will be obvious that the characters may also be swept in a vertical direction, whereby the characters are each rotated through 90° on the disk 2. In this case the blur is on the horizontal sides of the characters, rather than on the vertical sides. The preferable direction of scanning depends somewhat upon the particular style of the characters. If slanted scanning slits are used to scan the characters vertically, the bottoms of the characters do not remain horizontal, but assume a slanted position, while the vertical lines remain vertical. This distortion may be used for special effects, as in displays.

Fig. 2 shows a variation of the embodiment of Fig. 1 in which the optical system 18 is replaced by a lens turret 26, and the projection system 22 is replaced by a lens turret 28.

From the above discussion it is clear that, while the lineal velocity of the characters $v_1$ is unaffected by the particular optical system employed, the velocity $v_2$ of the projected slit image is affected by the magnification of the lens system interposed between the slits and characters. In fact, this velocity is always $Mv_1$. Accordingly, the various lens systems of the turret 26 shown in Fig. 2a are designed for different magnification ratios M. In each of the systems, however, the conjugate foci of each lens are coincident with the planes in which the slits and characters lie. It follows that the degree of expansion or condensation in width of the type face may be varied by selective interposition of the various lens systems in the turret 26.

The turret 28 may be similarly constructed. The use of lens systems of varying magnification in this turret affects the character image size in both dimensions, rather than in one only. It follows that the selective use of the turret 28 provides means for changing the point size of the projected characters.

The embodiments of Figs. 1 and 2 presuppose that the characters and slits are disposed at the same radius. The embodiment of Figs. 3 and 4 comprises an arrangement in which the slits are at a different radius from the characters. In many respects, this embodiment is similar to that described in our copending application, Serial No. 186,652, filed September 20, 1950, although the device there described operates on the so-called "stop-motion flash" principle. A continuously rotating motor 30 drives a shaft 32 to which is rigidly secured a decoder device 34. Through a pair of spur gears 36 and 38, the motor drives a shaft 40 journalled in a support 42. The support 42 is rotatable about a shaft 44 in fixed bearings 46 and 48. An arm 50, to which is secured an extension 52 rotates through the same angle as the shaft 40 about the axis of the shaft 44.

To the shaft 40 are rigidly secured two disks 54 and 56, the disk 54 bearing a circle of slits, and the disk 56 bearing a number of circles of characters, each circle comprising characters of a different style or font.

The optical system for the projection of characters includes a light source 58, a condenser lens 60, the aperture disk 54, a lens turret 62, corresponding to the optical system 18 of Fig. 1 or the lens turret 26 of Fig. 2, a pair of right-angle reflecting prisms 64 and 66, the character disk 56, and a lens turret 68, corresponding to the projection system 22 of Fig. 1 or the lens turret 28 of Fig. 2.

Assuming for the moment that the shaft 40 is in a fixed axis, the operation of the optical system is much the same as that described in connection with Fig. 1, except for the addition of the periscopic elements 64, 66, which are made necessary by the difference in radii of the characters and slits. It is obvious, of course, that the elements 64 and 66 might be plane reflectors, pentaprisms, or any other form of optical device suitable for the same purpose.

By means of a so-called "potato cam" 70, the shaft 40 is rotatable about the axis of the shaft 44, which is coincident with the axis of the shaft 32, whereby the shaft 40 may rotate through any one of a number of discrete angles determined by the points of the cam to bring a corresponding circle of characters into position for projection. At the same time, the change in angular position is reflected by a change in the orientation of brushes 72 on the extension 52 wiping the surface of the decoder device 34. The decoder is not here described in detail, since its function is fully described in the above-mentioned application. Through appropriate circuits, this device may be used to control the connection of the light source 58 to a voltage source, so that the lamp 58 is illuminated only during the interval of time in which the image of the aperture corresponding to the selected character is projecting any part of the character upon a sensitive surface 74.

By reason of the arrangement of the parts, it is seen that if simple lens systems were employed in the turret 62, the slit images would sweep the characters in a horizontal direction while the characters moved in a vertical direction. However, as already indicated, the slits may be caused to sweep the characters in any desired direction by the incorporation of appropriate optical elements, as is well known in the art.

It will be apparent that the equations given above for distortion and blur are applicable to this embodiment as well as to that of Fig. 1.

In the embodiments discussed above, the slits are disposed on one disk while the characters are disposed on another. In the embodiment of Fig. 5, the slits or apertures are mounted on the same disk with the characters. Reflecting prisms 76 and 78, and an optical system 80 direct the projected aperture image of the corresponding character in a manner which will be evident from the above description. A sheet 82 provides the necessary optical shielding.

In Fig. 5 a second font of characters is shown immediately below the upper case font in projection position. In order to project this second font it is not necessary to move the disk in the manner described in connection with Figs. 3 and 4. Instead, the optical elements are moved to a position which permits the slit image to sweep the lower font and causes the projection of the character image against the same area of the sensitized surface as that which would be exposed by the projection of the upper case font. The details as to the optical requirements to produce this result are familiar to those skilled in this art. A lens turret similar to those discussed in connection with Fig. 2 may be used in place of mechanism for changing the relative positions of the elements. In this case it would be convenient to incorporate all of the necessary optical elements in each turret position. It will be apparent that the front-changing principle here employed may be used in other embodiments, as for example that of Figs. 1 or 2.

Having thus described our invention, we claim:

1. Photographic composing apparatus comprising a carrier including two disks in rigid relationship, one disk bearing the characters to be photographed and the other disk bearing a number of apertures, each in precise angular relation to a corresponding character about a given axis, a source of light in position to illuminate an aperture, an optical system to receive the light from the illuminated aperture and to direct an image of the aperture toward its corresponding character to form a partial image of the character, projection means to focus the partial image upon a sensitive material, and mechanism for rotating the disks continuously relative to the source of light, optical system and projection means, and about said axis, whereby the image of the aperture moves progressively across the character and the entire image of the character is projected.

2. Photographic composing apparatus comprising a carrier including two disks in rigid relationship, one disk bearing the characters to be photographed and the other disk bearing a number of apertures, each in precise angular relation to a corresponding character about a given axis, a source of light in position to illuminate an aperture, an optical system to receive the light from the illuminated aperture and to direct an image of the aperture toward its corresponding character to form a partial image of the character, projection means to focus the partial image upon a sensitive material, mechanism for rotating the disk continuously relative to the source of light, optical system and projection means, and about said axis, whereby the image of the aperture moves progressively across the character and the entire image of the character is projected, and means for interchanging the optical system with elements of different focal lengths for changing the degree of expansion or contraction of the character image in one dimension.

3. Photographic composing apparatus comprising a carrier including two disks in rigid relationship, one disk bearing the characters to be photographed and the other disk bearing a number of apertures, each in precise angular relation to a corresponding character about a given axis, a source of light in position to illuminate an aperture, an optical system to receive the light from the illuminated aperture and to direct an image of the aperture toward its corresponding character to form a partial image of the character, projection means to focus the partial image upon a sensitive material, mechanism for rotating the disks continuously relative to the source of light, optical system and projection means, and about said axis, whereby the image of the aperture moves progressively across the character and the entire image of the character is projected, and means for interchanging the projection means with elements of different magnification for changing the degree of expansion or contraction of the character image in two dimensions.

4. Photographic composing apparatus comprising a rotatable disk bearing the characters to be photographed and apertures, each in precise angular relation to a corresponding character about the axis of rotation, said characters and apertures being arranged in concentric circles about the axis of rotation, a source of light in position to illuminate an aperture, an optical system to receive the light from the illuminated aperture and to direct an image of the aperture toward its corresponding character to form a partial image of the character, projection means to focus the partial image upon a sensitive material, and mechanism for rotating the disk continuously relative to the source of light, optical system and projection means, whereby the image of the aperture moves progressively across the character and the entire image of the character is projected.

5. Photographic composing apparatus comprising a rigid, rotatable carrier including a disk bearing a number of fonts of characters to be photographed, the fonts being arranged in concentric circles about the axis of rotation, and a disk bearing a circle of apertures, each aperture being in precise angular relation to a character in each circle about the axis of rotation, a source of light in position to illuminate an aperture, an optical system to receive the light from the illuminated aperture and to direct an image of the aperture toward one of its corresponding characters to form a partial image of the character, projection means to focus the partial image upon a sensitive material, mechanism for moving the carrier relative to the source of light, optical system and projection means, whereby the image of the aperture moves progressively across the character and the entire image of the character is projected, and font-changing mechanism for rotating the character bearing disk about an axis passing substantially through the aperture circle, whereby the image of each aperture may be directed to a corresponding character in a selected font.

6. Photographic composing apparatus comprising a rigid structure bearing the characters to be photographed and a number of apertures, each character having a corresponding aperture, a source of light in position to illuminate an aperture, an optical system to receive the light from the illuminated aperture and to direct an image of the aperture toward its corresponding character to form a partial image of the character, projection means to focus the partial image upon a sensitive material, and mechanism for moving said structure relative to the source of light, optical system and projection means, each aperture being precisely displaced from its corresponding character in the direction of relative movement, whereby the image of the aperture moves progressively across the character and the entire image of the character is projected.

7. Photographic composing apparatus comprising a rigid structure bearing the characters to be photographed and a number of apertures, each character having a corresponding aperture, a source of light in position to illuminate an aperture, an optical system to receive the light from the illuminated aperture and to direct an image of the aperture which is narrow in comparison with the width of any character toward its corresponding character to form a partial image of the character, projection means to focus the partial image upon a sensitive material, and mechanism for moving said structure relative to the source of light, optical system and projection means, each aperture being precisely displaced from its corresponding character in the direction of relative movement, whereby the image of the aperture moves progressively across the character and the entire image of the character is projected.

8. Photographic composing apparatus comprising a rigid structure bearing the characters to be photographed and a number of apertures, each character having a corresponding aperture, a source of light in position to illuminate an aperture, an optical system to receive the light from the illuminated aperture and to direct an image of the aperture toward its corresponding character to form a partial image of the character, projection means to focus the partial image upon a sensitive material, mechanism for moving said structure relative to the source of light, optical system and projection means, each aperture being precisely displaced from its corresponding character in the direction of relative movement, whereby the image of the aperture moves progressively across the character and the entire image of the character is projected, and shutter means to interrupt the illumination of the apertures by the light source except for an interval of time including the interval during which any part of a selected character is being projected.

9. Photographic composing apparatus comprising a rigid structure bearing the characters to be photographed and a number of apertures, each character having a corresponding aperture, a source of light in position to illuminate an aperture, an optical system to receive the light from the illuminated aperture and to direct an image of the aperture toward its corresponding character to form a partial image of the character, projection means to focus the partial image upon a sensitive material, and mechanism for moving said structure relative to the source of light, optical system and projection means, each aperture being precisely displaced from its corresponding character in the direction of relative movement, whereby the image of the aperture moves progressively across the character in the reverse of the direction of motion of said character relative to the optical system and the entire image of the character is projected.

10. Photographic composing apparatus comprising a rigid structure bearing the characters to be photographed and a number of apertures, each character having a corresponding aperture, a source of light in position to illuminate an aperture, an optical system to receive the light from the illuminated aperture and to direct an image of the aperture toward its corresponding character to form a partial image of the character, projection means to focus the partial image upon a sensitive material, and mechanism for moving said structure relative to the source of light, optical system and projection means, each aperture being precisely displaced from its corresponding character in the direction of relative movement, whereby the image of the aperture made by said optical system moves progressively across the character in the same direction as the motion of said character relative to the optical system, and the entire image of the character is projected.

11. Photographic composing apparatus comprising a rigid structure bearing the characters to be photographed and a number of apertures, each character having a corresponding aperture, a source of light in position to illuminate an aperture, an optical system to receive the light from the illuminated aperture and to direct a slanted image of the aperture toward its corresponding character to form a partial image of the character, projection means to focus the partial image upon a sensitive material, and mechanism for moving said structure relative to the source of light, optical system and projection means, each aperture being precisely displaced from its corresponding character in the direction of relative movement, whereby the image of the aperture moves progressively across the character and a slanted image of the character is projected.

12. Photographic composing apparatus comprising a rigid structure bearing the characters to be photographed and a number of apertures, each character having a corresponding aperture, a source of light in position to illuminate an aperture, an optical system to receive the light from the illuminated aperture and to direct an image of the aperture toward its corresponding character to form a partial image of the character, projection means to focus the partial image upon a sensitive material, mechanism for moving said structure relative to the source of light, optical system and projection means, each aperture being precisely displaced from its corresponding character in the direction of relative movement, whereby the image of the aperture moves progressively across the character and the entire image of the character is projected, and means for interchanging the optical system with elements of different focal lengths for changing the degree of expansion or contraction of the character image in one dimension.

13. Photographic composing apparatus comprising a rigid structure bearing the characters to be photographed and a number of apertures, each character having a corresponding aperture, a source of light in position to illuminate an aperture, an optical system to receive the light from the illuminated aperture and to direct an image of the aperture toward its corresponding character to form a partial image of the character, projection means to focus the partial image upon a sensitive material, mechanism for moving said structure relative to the source of light, optical system and projection means, each aperture being precisely displaced from its corresponding character in the direction of relative movement, whereby the image of the aperture moves progressively across the character and the entire image of the character is projected, and means for interchanging the projection means with elements of different magnification for changing the degree of expansion or contraction of the character image in two dimensions.

References Cited in the file of this patent

UNITED STATES PATENTS

| | | |
|---|---|---|
| 1,946,934 | Dorst | Feb. 13, 1934 |
| 2,257,938 | Clothier | Oct. 7, 1941 |
| 2,486,406 | Higonnet | Nov. 1, 1949 |